(12) United States Patent
Chan

(10) Patent No.: US 10,631,529 B2
(45) Date of Patent: Apr. 28, 2020

(54) TORQUE LIMITING DEVICE FOR FISHING REEL AND SPINNING REEL

(71) Applicant: Shimano Components (Malaysia) SDN. BHD., Pontian, Johor (MY)

(72) Inventor: Yik Hui Chan, Johor (MY)

(73) Assignee: SHIMANO COMPONENTS (MALAYSIA) SDN. BHD., Johor (MY)

( * ) Notice: Subject to any disclaimer, the term of this patent is extended or adjusted under 35 U.S.C. 154(b) by 0 days.

(21) Appl. No.: 16/356,614

(22) Filed: Mar. 18, 2019

(65) Prior Publication Data

US 2019/0327948 A1 Oct. 31, 2019

(30) Foreign Application Priority Data

Apr. 26, 2018 (JP) .................................. 2018-085819

(51) Int. Cl.
*A01K 89/01* (2006.01)
*A01K 89/015* (2006.01)

(52) U.S. Cl.
CPC .. *A01K 89/01907* (2015.05); *A01K 89/01931* (2015.05)

(58) Field of Classification Search
CPC ............ A01K 89/0114; A01K 89/0186; A01K 89/0187; A01K 89/01903
See application file for complete search history.

(56) References Cited

U.S. PATENT DOCUMENTS

| | | | | |
|---|---|---|---|---|
| 4,524,922 A * | 6/1985 | Vivarelli | .............. | A01K 89/016 242/256 |
| 5,443,218 A * | 8/1995 | Ciocca | .................. | A01K 89/01 242/256 |
| 6,112,863 A * | 9/2000 | Colletti | ................... | F16D 49/10 188/77 R |
| 6,345,436 B1 * | 2/2002 | Codrington | ............. | B25B 13/48 29/213.1 |
| 6,457,662 B1 * | 10/2002 | Sato | ....................... | A01K 89/01 242/247 |
| 7,216,825 B2 * | 5/2007 | Oishi | ................. | A01K 89/0186 242/247 |
| 7,290,727 B1 * | 11/2007 | Matsuda | ............ | A01K 89/0117 242/238 |
| 10,010,061 B2 * | 7/2018 | Saito | ..................... | A01K 89/006 |
| 2002/0131871 A1 * | 9/2002 | Ota | ...................... | B60H 1/3222 417/222.1 |
| 2013/0075218 A1 * | 3/2013 | Takechi | ............... | A01K 89/015 192/55.1 |
| 2013/0075512 A1 * | 3/2013 | Takechi | ............. | A01K 89/0155 242/283 |
| 2016/0219853 A1 * | 8/2016 | Takechi | ............. | A01K 89/0183 |
| 2016/0262362 A1 * | 9/2016 | Takechi | ................. | A01K 89/01 |

FOREIGN PATENT DOCUMENTS

| | | |
|---|---|---|
| JP | 2013-70652 A | 4/2013 |
| JP | 2016-86702 A | 5/2016 |

* cited by examiner

*Primary Examiner* — Emmanuel M Marcelo
(74) *Attorney, Agent, or Firm* — Global IP Counselors, LLP

(57) ABSTRACT

A torque limiting device includes a first rotating member, a second rotating member, an engagement member, and a biasing member. The biasing member biases the engagement member from a first rotating member toward a second rotating member. The biasing member biases the engagement member in a direction inclined relative to a radial direction of the first rotating member.

7 Claims, 9 Drawing Sheets

TORQUE LIMITING DEVICE FOR FISHING REEL AND SPINNING REEL

CROSS-REFERENCE TO RELATED APPLICATIONS

This application claims priority to Japanese Patent Application No. 2018-085819, filed on Apr. 26, 2018. The entire disclosure of Japanese Patent Application No. 2018-085819 is hereby incorporated herein by reference.

BACKGROUND

Field of the Invention

The present invention relates to a torque limiting device for a fishing reel. In particular, the present invention relates to a spinning reel having a torque limiting device.

Background Art

Conventional fishing reels can have a torque limiter (torque limiting device) on a rotation transmission path (for example, refer to Japanese Published Unexamined Application Nos. 2013-070652 and 2016-086702). This torque limiting device comprises, for example, a handle shaft (first rotating member), a first gear (second rotating member) rotatably disposed radially outside of the handle shaft, a pin member (engagement member) disposed on the handle shaft, and a biasing member that biases the pin member toward an engagement recess (recess) of the first gear. In this case, the pin member is biased in a radial direction (direction orthogonal to the direction of rotation in which the first gear rotates relative to the handle shaft) by the biasing member. In such a torque limiting device, it is possible to prevent the fishing line and members along the rotation transmission path from becoming damaged due to high load or impact.

In conventional torque limiting devices, including the fishing reel of Japanese Published Unexamined Application No. 2016-086702, the limiting torque is increased or decreased according to the degree of inclination of a recess against which an engagement member biased in the radial direction abuts. For example, if the inclination of the recess is gradual, the conventional torque limiting device rotates smoothly, thus the limiting torque of the torque limiting device is decreased. On the other hand, if the inclination of the recess is close to perpendicular relative to the circumferential direction, the limiting torque of the torque limiting device is increased.

It is expected that with such a torque limiting device, the limiting torque could be raised without increasing the size of the device. However, according to the conventional method, if the inclination of the recess is set to be perpendicular in order to raise the limiting torque, the shearing force that acts on the engagement member increases.

Designs in which this shearing force is taken into consideration may include such measures as making the engagement member thicker, as well as other means that can be employed in order to increase the limiting torque, such as increasing the diameter of the recess and increasing the wire diameter and compression amount of the biasing means or device (coil spring). However, with such methods, the size of the torque limiting device increases.

SUMMARY

The present invention was made in light of problems described above, and an object of the present invention is to provide a torque limiting device with which it is possible to raise the limiting torque without increasing the size of the device.

A torque limiting device for a fishing reel according to one aspect of the present invention comprises a first rotating member, a second rotating member, an engagement member, and a biasing member. The first rotating member is disposed so as to be rotatable relative to a reel body. The second rotating member is disposed so as to be rotatable relative to the first rotating member radially outside of the first rotating member. The second rotating member has a recess on an inner circumferential portion.

The engagement member is disposed on the first rotating member. The engagement member causes the second rotating member to rotate integrally with the first rotating member by engaging the recess. The biasing member biases the engagement member from the first rotating member toward the second rotating member. Here, the biasing member biases the engagement member in a direction that is inclined relative to the radial direction of the first rotating member.

In the torque limiting device of the present invention, since the biasing member is configured to bias the engagement member in a direction that is inclined relative to the radial direction of the first rotating member, it is possible to raise the limiting torque without increasing the size.

In the torque limiting device for a fishing reel according to another aspect of the present invention, when one of either the first rotating member or the second rotating member rotates in a line winding (reeling) direction, and the other element, that is, the second rotating member or the first rotating member, limits the rotation of the one of the first rotating member or the second rotating member, preferably the biasing member biases the engagement member so as to be inclined relative to the radial direction, increasing the limiting torque.

In this configuration, since the biasing member biases the engagement member so as to be inclined relative to the radial direction of the first rotating member to generate the limiting torque it is possible to increase the limiting torque without increasing the size of the torque limiting device.

In the torque limiting device for a fishing reel according to another aspect of the present invention, the recess preferably has a pressing surface and a sliding surface. The pressing surface is a surface that is pressed by the engagement member when the first rotating member and the second rotating member integrally rotate. The sliding surface is a surface on which the engagement member slides when the first rotating member and the second rotating member rotate relative to each other.

In this configuration, it is possible to more suitably raise the limiting torque when the first rotating member and the second rotating member rotate relative to each other. In addition, it is possible to cause the first rotating member and the second rotating member to smoothly rotate relative to each other.

A spinning reel according to one aspect of the present invention comprises a reel body including a rotatable handle, a spool around which a fishing line is wound by rotation of the handle, a reciprocating mechanism having a slider that causes the spool to move back and forth in a spool shaft direction in order to uniformly wind the fishing line around the spool, and the above-described torque limiting device disposed between the handle and the slider.

In the present spinning reel, for example, if a user (angler) drops the spinning reel and the spool is subject to an impact force, torque due to the impact can be transmitted from the spool side to the handle side via the slider.

However, in the present spinning reel, since the torque limiting device is disposed between the handle and the slider, transmission of torque from the slider to the handle side by the torque limiting device can be suppressed.

In addition, if impact from the spool is transmitted to the handle side by rotation in the direction opposite to the reeling direction, by adding the configuration described above, excess impact acting on an anti-reverse rotation mechanism can be suppressed.

In addition, in the present spinning reel, since the limiting torque of the torque limiting device is increased, as described above, when winding the handle, the angler is able to operate the torque limiting device at the desired torque.

In the spinning reel according to another aspect of the present invention, the first rotating member of the torque limiting device preferably has an engagement portion that engages the slider. In this embodiment, the second rotating member of the torque limiting device has a gear portion to which torque from a drive shaft is transmitted.

According to this configuration, it is possible to suppress the transmission of the torque from the slider to the drive shaft by the torque limiting device. In addition, during winding of the handle, the angler is able to operate the torque limiting device at the desired torque.

Thus, in the present invention, the limiting torque of the torque limiting device can be increased without enlarging the device.

DETAILED DESCRIPTION OF THE EMBODIMENT

Figure 1:
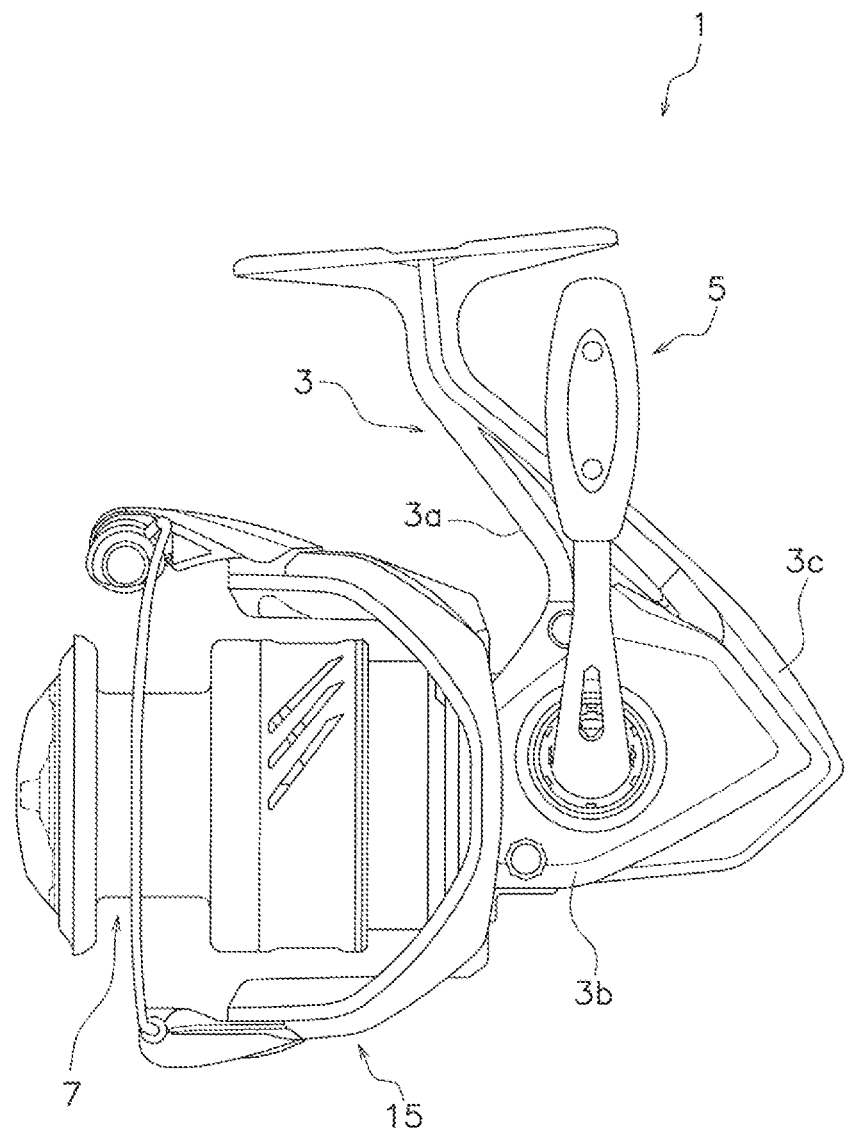
FIG. 1 is a side view of a spinning reel employing one embodiment of the present invention.
Figure 2:
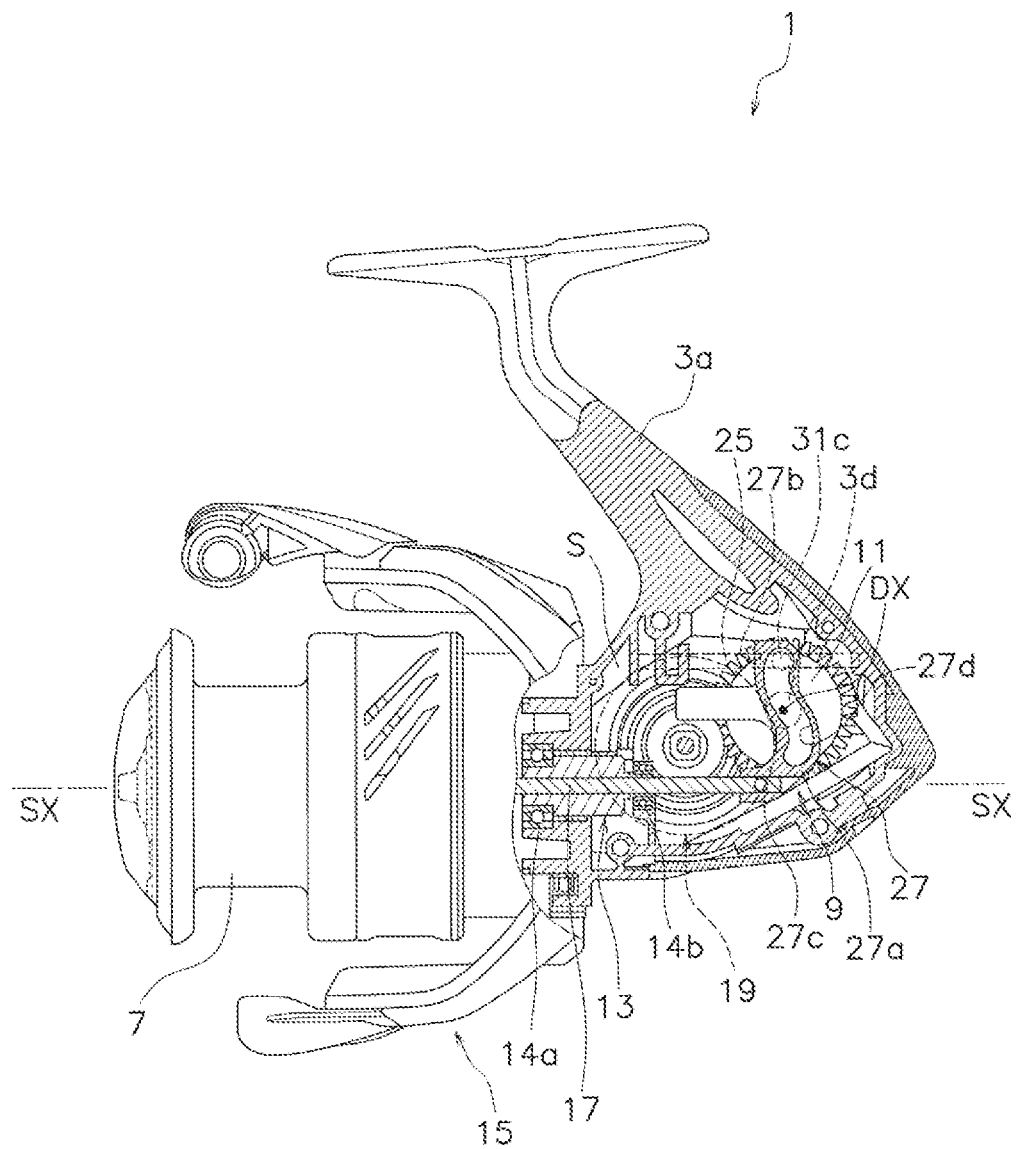
FIG. 2 is a cross-sectional view of the spinning reel.

As shown in FIGS. 1 and 2, a spinning reel 1 employing one embodiment of the present invention comprises a reel body 3, a handle 5, a spool 7, a reciprocating mechanism 9, and a sliding gear 11 (one example of a torque limiting device).

More specifically, the spinning reel 1 comprises the reel body 3, the handle 5, the spool 7, a pinion gear 13, a rotor 15, a spool shaft 17, a drive mechanism 19, the reciprocating mechanism 9, and the sliding gear 11.

Reel Body

As shown in FIG. 1, the reel body 3 includes a housing portion 3a, a lid member 3b, and a guard member 3c. The housing portion 3a has an internal space S (refer to FIG. 2). The housing portion 3a is partially open. The reciprocating mechanism 9, the drive mechanism 19, and the like, are housed in the internal space S of the housing portion 3a.

As shown in FIG. 2, the housing portion 3a supports the sliding gear 11 so as to be rotatable. A support shaft 3d, which supports the sliding gear 11 so as to be rotatable, is disposed on the housing portion 3a. The support shaft 3d protrudes from an inner circumferential surface of the housing portion 3a. An axis of the support shaft 3d is coaxial with a rotational axis DX of the sliding gear 11 and is parallel to an axis KX of the drive shaft 21 (refer to FIG. 3).

As shown in FIG. 1, the lid member 3b is attached to the housing portion 3a so as to cover the opening of the housing portion 3a. The guard member 3c is attached to the housing portion 3a so as to cover the rear side of the reel body 3.

Handle

As shown in FIG. 1, the handle 5 is disposed on the reel body 3 so as to be rotatable. For example, the handle 5 is disposed on a side of the reel body 3, for example, on a side of the housing portion 3a, so as to be rotatable relative to the reel body 3. The handle 5 is attached to a handle shaft 6 (refer to FIG. 3) so as to be integrally rotatable therewith. The handle 5 may be disposed on a side of the lid member 3b so as to be rotatable relative to the reel body 3.

Spool

A fishing line is wound around the spool 7. As shown in FIG. 2, the spool 7 is attached to the spool shaft 17. More specifically, the spool 7 is attached to the spool shaft 17 via a knob member that is screwed onto a distal end of the spool shaft 17. The spool 7 is moved back and forth in the spool shaft direction together with the spool shaft 17 by the reciprocating mechanism 9. The spool shaft direction is the direction in which axis SX of the spool shaft 17 extends.

Pinion Gear

As shown in FIG. 2, the pinion gear 13 is disposed in the reel body 3, for example, the housing portion 3a. The pinion gear 13 is supported by the housing portion 3a of the reel body 3 so as to be freely rotatable via shaft bearings 14a, 14b. The pinion gear 13 is formed in an essentially tubular shape. The spool shaft 17 is inserted through the inner circumferential portion of the pinion gear 13. The pinion gear 13 is disposed between a drive gear 23 (described further below) and the housing portion 3a.

Rotor

The rotor 15 is used to wind the fishing line around the spool 7. As shown in FIG. 2, the rotor 15 is disposed on the pinion gear 13. More specifically, the rotor 15 is attached to the pinion gear 13 so as to be integrally rotatable with the pinion gear 13.

Spool Shaft

As shown in FIG. 2, the spool shaft 17 is disposed between the drive gear 23 and the housing portion 3a in the reel body 3, for example, inside the housing portion 3a. The spool shaft 17 is supported by the housing portion 3a of the reel body 3 so as to be capable of moving back and forth relative to the housing portion 3a of the reel body 3 in the spool shaft direction.

For example, the spool shaft 17 is inserted through the inner circumferential portion of the pinion gear 13. The spool shaft 17 is supported by the housing portion 3a of the reel body 3 so as to be capable of moving back and forth relative to the housing portion 3a of the reel body 3 by the reciprocating mechanism 9.

One end portion of the spool shaft 17 is attached to the spool 7. The other end portion of the spool shaft 17 is fixed to a slider 27 (described further below) of the reciprocating mechanism 9. As a result, when the spool shaft 17 is moved back and forth in the spool shaft direction by the reciprocating mechanism 9, the spool 7 moves back and forth in the spool shaft direction together with the spool shaft 17.

Drive Mechanism

Figure 3:
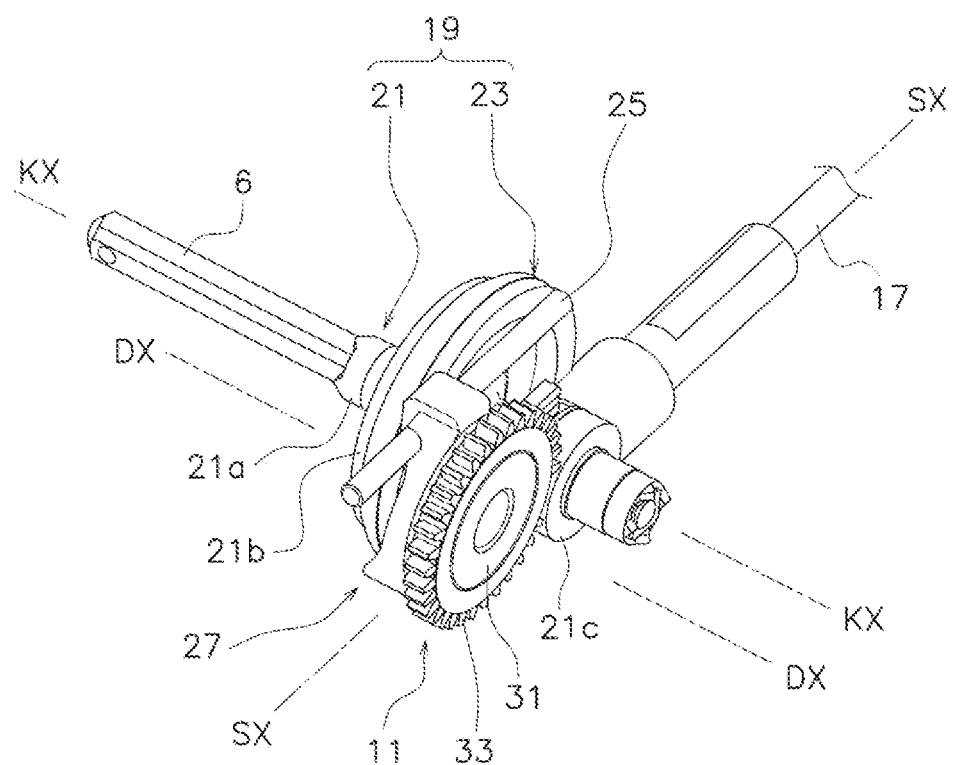
FIG. 3 is a perspective view of a drive mechanism and a sliding gear.

As shown in FIG. 3, the drive mechanism 19 includes the drive shaft 21 and the drive gear 23. The drive shaft 21 is supported by the reel body 3 so as to be rotatable. More specifically, the drive shaft 21 is supported in the housing portion 3a and the lid member 3b so as to be rotatable via a shaft bearing, which is not shown. An anti-reverse mechanism (not shown) can prevent the drive shaft 21 from rotating backwards.

The drive shaft 21 comprises a tubular portion 21a, an annular portion 21b, and a first gear portion 21c. The tubular portion 21a is formed in an essentially tubular shape. The handle shaft 6 is mounted on the tubular portion 21a so as to be integrally rotatable therewith.

For example, the handle shaft 6 is inserted through the inner circumferential portion of the tubular portion 21a. The inner circumferential surface of the tubular portion 21a and the outer circumferential surface of the handle shaft 6 have a non-circular engagement. Thus, the drive shaft 21 integrally rotates with the handle shaft 6.

The annular portion 21b is integrally formed with the tubular portion 21a. The annular portion 21b projects radially outwardly from the tubular portion 21a and is formed in an essentially annular shape. The drive gear 23 is attached to the annular portion 21b so as to be integrally rotatable therewith.

The first gear portion 21c is integrally formed with the tubular portion 21a. The first gear portion 21c is formed spaced apart from the annular portion 21b in a drive shaft direction in which the axis KX of the drive shaft 21 extends. Here, the first gear portion 21c meshes with the sliding gear 11. When the first gear portion 21c rotates, the reciprocating mechanism 9 is operated via the sliding gear 11.

Hereinbelow, the drive shaft direction is defined as the axial direction, i.e., the direction in which the axis of the drive shaft 21 extends and an axial direction parallel to this axis direction.

The drive gear 23 is disposed so as to be integrally rotatable with the drive shaft 21. Here, the drive gear 23 is disposed between the first gear portion 21c and the annular portion 21b of the drive shaft 21 and fixed to the annular portion 21b of the drive shaft 21. In this embodiment, the drive gear 23 is a face gear and meshes with the pinion gear 13. When the drive gear 23 rotates, the rotor 15 rotates via the pinion gear 13.

Reciprocating Mechanism

The reciprocating mechanism 9 is a mechanism for moving the spool shaft 17 back and forth in the spool shaft direction relative to the reel body 3 by the rotation of the handle 5. As shown in FIGS. 2 and 3, the reciprocating mechanism 9 comprises a guide shaft 25 and the slider 27.

The guide shaft 25 guides the slider 27 in the spool shaft direction. The guide shaft 25 is disposed parallel to the spool shaft 17. In this embodiment, the guide shaft 25 is disposed above the spool shaft 17. The guide shaft 25 is fixed to the reel body 3, for example, the housing portion 3a.

The slider 27 is disposed between the drive gear 23 and the housing portion 3a in the drive shaft direction. More specifically, the slider 27 can be disposed between the drive gear 23 and the sliding gear 11 in the drive shaft direction.

The slider 27 is disposed between the guide shaft 25 and the spool shaft 17 in a direction that intersects the drive shaft direction, for example, in the vertical direction. The slider 27 engages the sliding gear 11.

As shown in FIG. 2, the slider 27 has a slider body 27a, a guide hole 27b, a mounting portion 27c, and a guide groove 27d. The slider body 27a connects the guide shaft 25 and the spool shaft 17.

The guide hole 27b engages the guide shaft 25. For example, the guide hole 27b can be disposed on the slider body 27a, and the guide shaft 25 can be inserted through the guide hole 27b. The slider 27 can thereby move along the guide shaft 25.

The mounting portion 27c is attached to the spool shaft 17. For example, the mounting portion 27c can be disposed on the slider body 27a and fixed to the spool shaft 17. As a result, when the slider 27 moves along the guide shaft 25, the spool shaft 17 moves in the spool shaft direction.

The guide groove 27d can be disposed on the slider body 27a. The guide groove 27d is a long groove that curves and extends between the guide shaft 25 and the spool shaft 17. For example, when the slider 27 is seen from the lid member 3b side, the guide groove 27d is a long groove formed essentially in the shape of an S. A boss portion 31c (described further below) of the sliding gear 11 is disposed in the guide groove 27d.

Sliding Gear

The sliding gear 11 is disposed between the handle 5 and the slider 27 and transmits the torque from the handle 5 to the reciprocating mechanism 9. In addition, the sliding gear 11 functions as a torque limiter. In this embodiment, the sliding gear 11 limits the transmission of the torque between the drive shaft 21 (for example, the first gear portion 21c) and the reciprocating mechanism 9.

As shown in FIG. 3, the sliding gear 11 has an axis of rotation DX. Here, the axis of rotation DX is concentric with the axis of the support shaft 3d (refer to FIGS. 2 and 4). The sliding gear 11 is disposed between the slider 27 and the housing portion 3a in the drive shaft direction in which the axis of rotation DX extends. More specifically, the sliding gear 11 is positioned in the drive shaft direction by the slider 27 and the housing portion 3a.

As shown in FIG. 2, the sliding gear 11 engages the slider 27. As shown in FIG. 3, the sliding gear 11 engages with the first gear portion 21c of the drive shaft 21.

Figure 4:
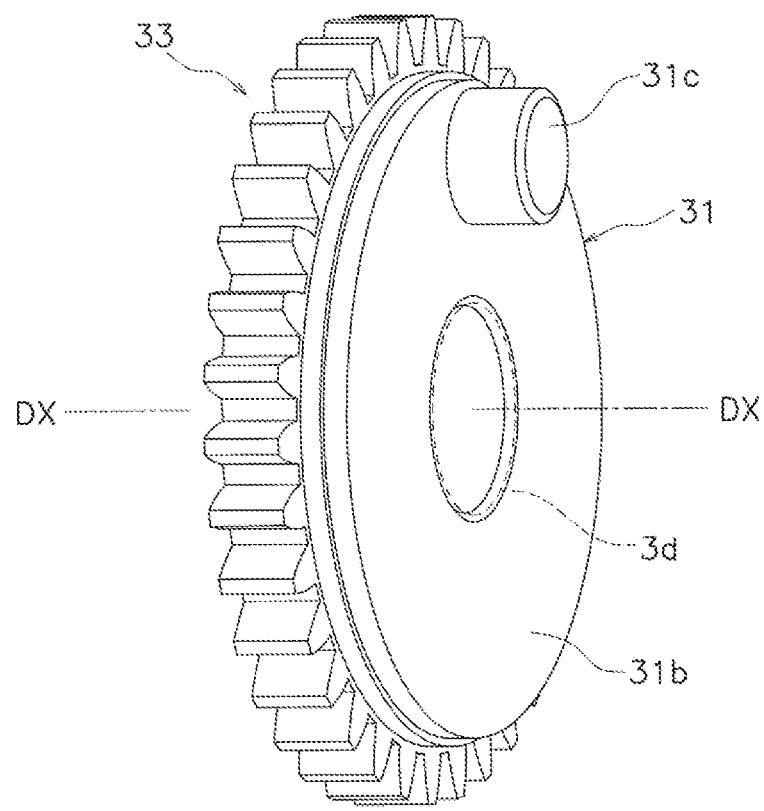
FIG. 4 is a perspective view of the sliding gear.
Figure 7:
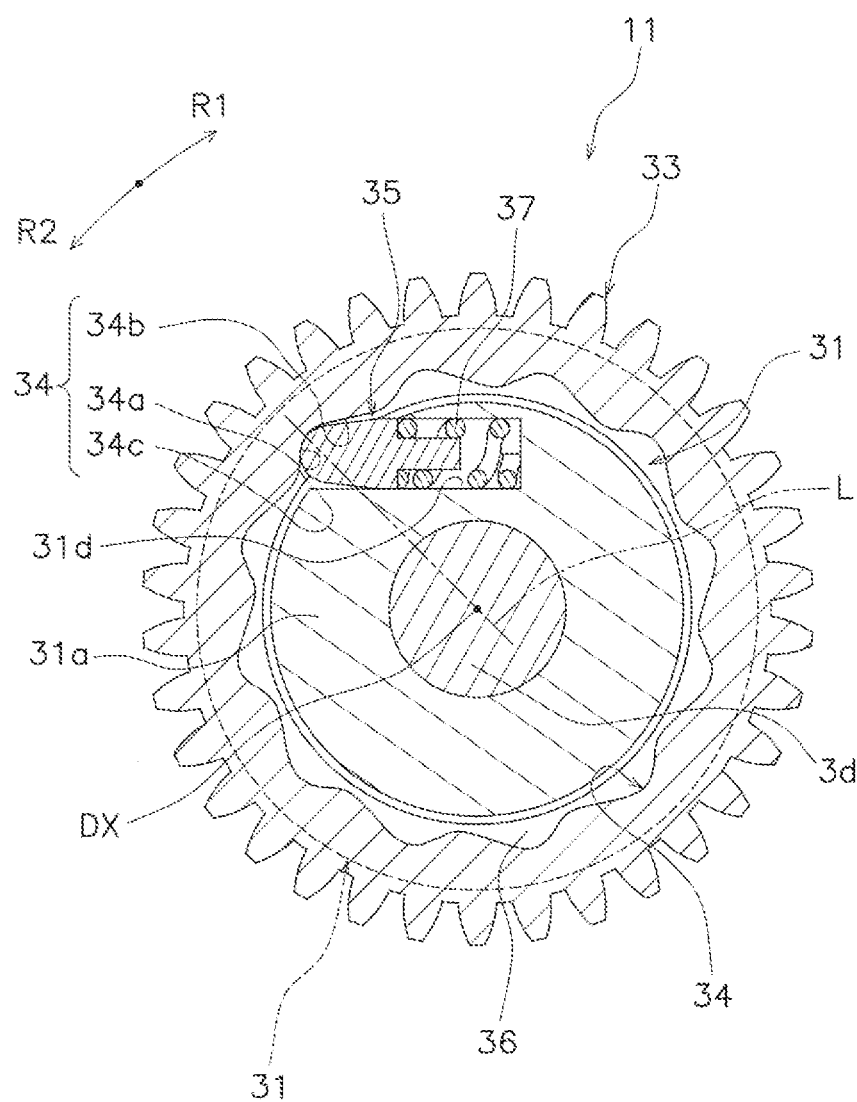
FIG. 7 is a cross-sectional view of the sliding gear.

As shown in FIGS. 4 and 7, the sliding gear 11 includes a main body portion 31 (one example of the first rotating member), a second gear portion 33 (one example of the second rotating member), a pin member 35 (one example of the engagement member), and a biasing member 37.

Figure 5:
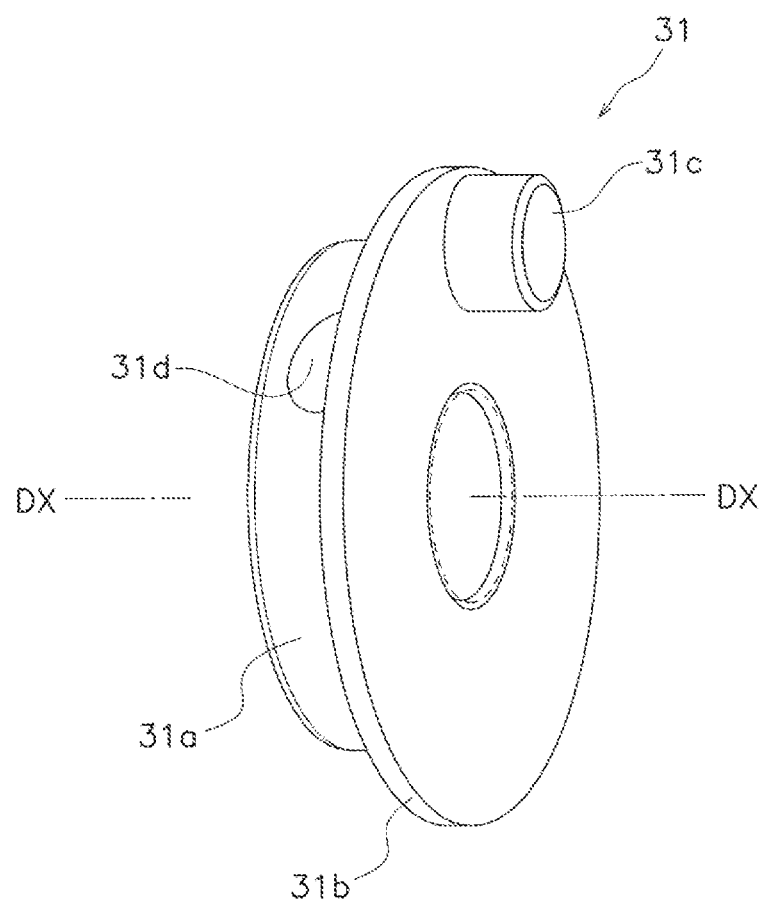
FIG. 5 is a perspective view of a main body of the sliding gear.

As shown in FIGS. 4 and 5, the main body portion 31 is disposed so as to be rotatable relative to the housing portion 3a. For example, the main body portion 31 is supported by the support shaft 3d of the housing portion 3a so as to be rotatable. The main body portion 31 includes a cylindrical portion 31a, a flange portion 31b, and the boss portion 31c (one example of the engagement portion).

The cylindrical portion 31a is formed to be essentially cylindrical. The support shaft 3d of the housing portion 3a is inserted through the inner circumferential portion of the cylindrical portion 31a. That is, the cylindrical portion 31a is disposed around the support shaft 3d so as to be rotatable.

As shown in FIGS. 4 and 7, a housing recess 31d is disposed in the outer peripheral portion of the cylindrical portion 31a. Preferably, the housing recess 31d can be a hole portion. The housing recess 31d extends in a direction that differs from the radial direction, from the outer circumferential surface of the cylindrical portion 31a (for example, the midpoint of the opening in the circumferential direction in FIG. 7) toward the axis of rotation DX. The pin member 35, described further below, is disposed in the housing recess 31d.

As shown in FIGS. 4 and 5, the flange portion 31b can be essentially annular and protrude from the cylindrical portion 31a in the radial direction. As shown in FIG. 7, the flange portion 31b is disposed facing a side surface of the second gear portion 33. For example, the flange portion 31b can be disposed to face the side surface of the second gear portion 33 so as to cover the engagement recess 34 (described further below).

As shown in FIGS. 4 and 5, the boss portion 31c is disposed on cylindrical portion 31a and flange portion 31b. In the present embodiment, the boss portion 31c straddles the cylindrical portion 31a and the flange portion 31b. The boss portion 31c projects from the cylindrical portion 31a and the flange portion 31b in the drive shaft direction. The boss portion 31c engages the guide groove 27d of the slider 27 (refer to FIG. 2). When the main body portion 31 rotates in this state, the boss portion 31c moves the slider 27 back and forth due to the engagement with the guide groove 27d.

The torque from the drive shaft 21 is transmitted to the second gear portion 33. As shown in FIG. 3, the second gear portion 33 meshes with the first gear portion 21c. The second gear portion 33 is disposed radially outside of the main body portion 31 so as to be rotatable relative to the main body portion 31.

Hereinbelow, as shown in FIG. 7, the direction of rotation in which the second gear portion 33 rotates when the torque from the drive shaft 21 (first gear portion 21c) is transmitted to the second gear portion 33 during winding of the fishing line will be referred to as a "first direction of rotation R1" and the direction of rotation opposite to the "first direction of rotation R1" will be referred to as the "second direction of rotation R2." In the present embodiment, the first direction of rotation R1 corresponds to the reeling direction.

Figure 6:
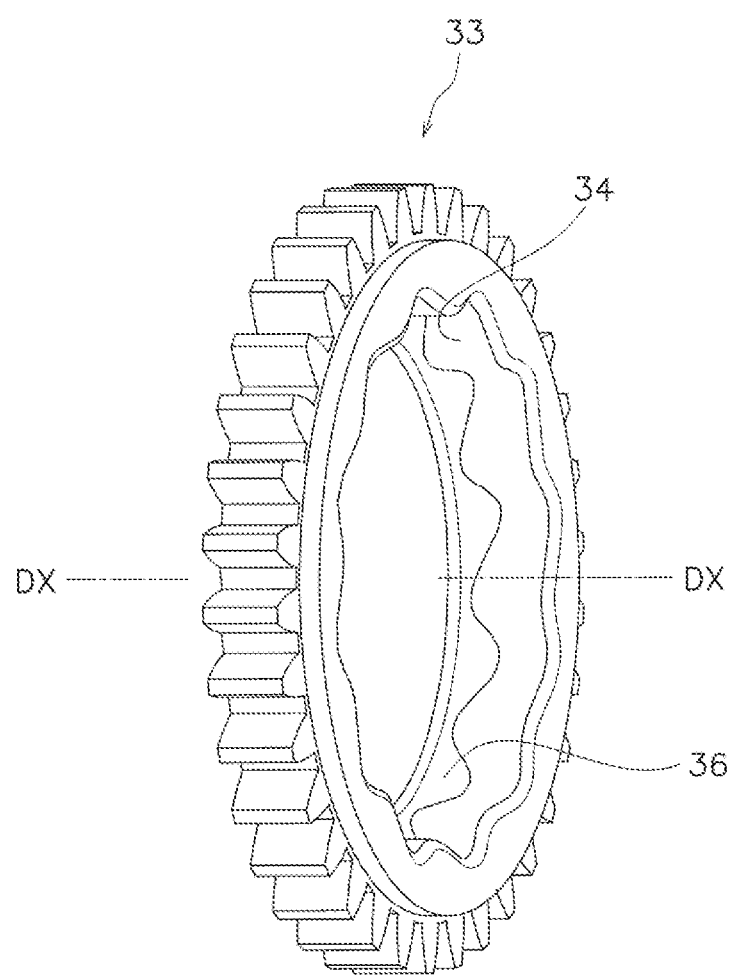
FIG. 6 is a perspective view of a second gear portion of the sliding gear.

As shown in FIGS. 4, 6, and 7, the second gear portion 33 can be an essentially annular shape. The second gear portion 33 is disposed outside of the cylindrical portion 31a in the radial direction away from the axis of rotation DX. That is, the inner circumferential surface of the second gear portion 33 is disposed facing the outer circumferential surface of the cylindrical portion 31a in the radial direction away from the axis of rotation DX.

As shown in FIGS. 6 and 7, the second gear portion 33 has at least one engagement recess 34. In the present embodiment, the second gear portion 33 has a plurality of engagement recesses 34. The plurality of engagement recesses 34 are formed in the inner circumferential portion of the second gear portion 33. For example, the engagement recesses 34 can be disposed at prescribed intervals in the circumferential direction around the axis of rotation DX. Each engagement recess 34 is formed in a concave shape on the inner circumferential surface of the second gear portion 33.

As shown in FIG. 7, the engagement recess 34 is asymmetrical when the second gear portion 33 is viewed in the drive shaft direction. More specifically, when the second gear portion 33 is viewed in the drive shaft direction, the engagement recess 34 is asymmetrical relative to a straight line L that connects the axis of rotation DX and a bottom portion of the engagement recess 34. Here, this straight line L is defined by the axis of rotation DX and a point on the bottom portion of the engagement recess 34 that is farthest from the axis of rotation DX.

The engagement recess 34 has a pressing surface 34a and sliding surfaces 34b, 34c. The pressing surface 34a is the surface that is pressed by the pin member 35 when the main body portion 31 and the second gear portion 33 integrally rotate. In other words, the pressing surface 34a is the surface of the engagement recess 34 with which the head portion of the pin member 35 contacts when the main body portion 31 and the second gear portion 33 integrally rotate.

The sliding surfaces 34b, 34c are surfaces on which the pin member 35 slides when the main body portion 31 and the second gear portion 33 rotate relative to each other. In other words, except for the pressing surface 34a, the sliding surfaces 34b, 34c are the surfaces of the engagement recess 34.

The sliding surface 34b is disposed on a downstream side, in the first direction of rotation R1, in each of the engagement recesses 34. The sliding surface 34b is formed so as to follow an axis PX of the pin member 35, in a state in which the pin member 35 is engaged with the engagement recess 34. The sliding surface 34c is disposed on an upstream side, in the first direction of rotation R1, in each of the engagement recesses 34. The pressing surface 34a is disposed between the sliding surface 34b and the sliding surface 34c in the circumferential direction.

As shown in FIGS. 6 and 7, the second gear portion 33 also has a wall portion 36 for restricting the pin member 35 from falling out in the drive shaft direction. The wall portion 36 is formed in an essentially annular shape. The wall portion 36 projects from the inner circumferential portion of the second gear portion 33 (including the engagement recess 34) radially inward and is disposed separately from the flange portion 31b of the main body portion 31 in the axial direction. The engagement recess 34 is disposed between the wall portion 36 and the flange portion 31b. That is, the pin member 35 is disposed between the wall portion 36 and the flange portion 31b.

Figure 8:
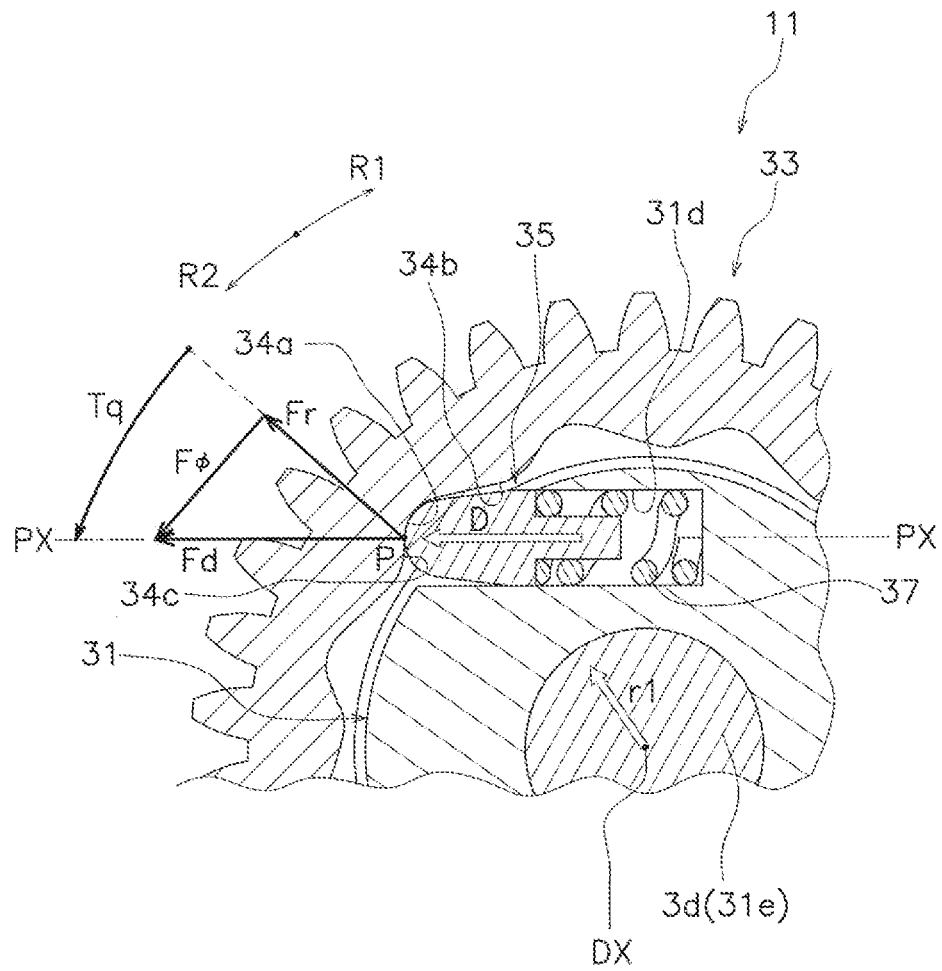
FIG. 8 is a partially enlarged cross-sectional view of the sliding gear.

As shown in FIGS. 7 and 8, the pin member 35 is disposed between the main body portion 31 and the second gear portion 33. For example, the pin member 35 is disposed in the housing recess 31d of the main body portion 31. The pin member 35 is biased toward the second gear portion 33 by the biasing member 37 disposed in the housing recess 31d of the main body portion 31.

The pin member 35 causes the second gear portion 33 to rotate integrally with the main body portion 31 by engaging the engagement recess 34 of the second gear portion 33. As shown in FIG. 8, the axis PX of the pin member 35 extends toward a direction (biasing direction D, described further below) that is inclined relative to a radial direction r1 of the main body portion 31.

The head portion of the pin member 35 engages one of the plurality of the engagement recesses 34. The shaft portion of the pin member 35 is integrally formed with the head portion and disposed in the housing recess 31d. The shaft portion of the pin member 35 has a smaller diameter than the head portion.

As shown in FIGS. 7 and 8, the biasing member 37 can be a coil spring. The biasing member 37 is disposed in the engagement recess 34 in a compressed state. The biasing member 37 is disposed between the housing recess 31d and the shaft portion of the pin member 35. One end portion of the biasing member 37 abuts the head portion of the pin member 35, and the other end portion of the biasing member 37 abuts the bottom portion of the engagement recess 34. The pin member 35 is thereby biased by the biasing member 37.

As shown in FIG. 8, the biasing member 37 biases the pin member 35 from the main body portion 31 toward the second gear portion 33. More specifically, the biasing member 37 biases the pin member 35 in a direction that is inclined relative to the radial direction r1 of the main body portion 31, for example, in the biasing direction D.

In one embodiment, when the second gear portion 33 rotates in the first direction of rotation R1 and the main body portion 31 limits the rotation of the second gear portion 33, the biasing member 37 is inclined relative to the radial direction r1 of the main body portion 31 so as to generate the torque Tq, described further below, and biases the pin member 35. That is, in this embodiment, the biasing member 37 is inclined relative to the radial direction r1 of the main body portion 31 so as to increase the limiting torque by the torque Tq and biases the pin member 35.

Here, by the biasing member 37 biasing the pin member 35 in the biasing direction D, the pressing surface 34a of the engagement recess 34 is pressed by the pin member 35. In this state, a biasing force Fd acts on the pressing surface 34a in the biasing direction D.

The biasing force Fd can be resolved into a force component Fr in the radial direction (radial force) and a force component Fφ in the tangential direction (tangential direction force) toward the second direction of rotation R2. That is, the radial force Fr and the tangential force Fφ act on the pressing surface 34a.

The torque Tq is calculated by multiplying the tangential force Fφ by the distance between the axis of rotation DX and a point of application P of the tangential force Fφ. The limiting torque when the sliding gear 11 functions as the torque limiter is raised by means of this torque Tq.

Operation of the Sliding Gear

The Sliding Gear Functioning as a Gear

When the drive shaft 21 rotates due to the rotation of the handle 5, the torque is transmitted from the first gear portion 21c of the drive shaft 21 to a second gear of the sliding gear 11. Here, if the torque that is transmitted from the first gear portion 21c to the second gear portion 33 is less than a prescribed value, the sliding gear 11 operates as follows.

First, the torque is transmitted from the first gear portion 21c to the second gear portion 33. Next, in the state in which the pin member 35 is engaged with the engagement recess 34 of the second gear portion 33, the main body portion 31 and the second gear portion 33 integrally rotate in the first direction of rotation R1. In this embodiment, the torque is transmitted from the drive shaft 21 to the slider 27 via the sliding gear 11 (second gear portion 33 and main body portion 31). That is, the sliding gear 11 functions as a gear that transmits torque.

Here, in the present embodiment, as described above, the tangential direction force Fφ is generated by biasing the pin member 35 in the biasing direction D, and the torque Tq is applied to the sliding gear 11 by this tangential direction force Fφ. The limiting torque of the sliding gear 11, which serves as the torque limiter, is raised by torque Tq.

When the torque is transmitted from the first gear portion 21c of the drive shaft 21 to the sliding gear 11 and the sliding gear 11 is rotated, the slider 27 moves the spool shaft 17, that is, the spool 7, back and forth by engagement between the boss portion 31c of the sliding gear 11 and the guide groove 27d of the slider 27.

The Sliding Gear Functioning as a Torque Limiter

First, the torque is transmitted from the first gear portion 21c to the second gear portion 33. At this time, when the torque that is greater than or equal to the limiting torque acts on the second gear portion 33, the engagement between the engagement recess 34 of the second gear portion 33 and the pin member 35 is released and only the second gear portion 33 rotates in the first direction of rotation R1 relative to the main body portion 31. In this manner, the sliding gear 11 functions as a torque limiter.

In this embodiment, the pin member 35 disposed in the housing recess 31d of the main body portion 31 presses the pressing surface 34a of the engagement recess 34, the sliding surface 34c on the upstream side in the first direction of rotation R1, the inner circumferential surface between the engagement recesses 34 adjacent in the circumferential direction (convex portion between the engagement recesses 34), and the sliding surface 34b on the downstream side in the first direction of rotation R1, in that order, as the second gear portion 33 rotates.

When the sliding gear functions as a mechanism for suppressing the torque that is transmitted in the torque transmission path in the opposite direction For example, if an angler drops the spinning reel 1, the spool 7 can be subjected to an impact force. The impact force is generally transmitted to the spool 7, the spool shaft 17, and the slider 27, in that order. There is then the possibility that the guide groove 27d of the slider 27 will press the boss portion 31c of the main body portion 31 due to the impact force, and that the torque will be transmitted to the handle side.

Here, when the first gear portion 21c rotates due to the rotation of the handle 5, the second gear portion 33 that meshes with the first gear portion 21c rotates in the first direction of rotation R1. On the other hand, backward rotation of the first gear portion 21c is prevented by the anti-reverse rotation mechanism. In addition, since the second gear portion 33 meshes with the first gear portion 21c, the backward rotation of the second gear portion 33 (rotation in the second direction of rotation R2) is restricted by the anti-reverse rotation mechanism via the first gear portion 21c.

In this state, if the main body portion 31 rotates in the second direction of rotation R2 due to the impact force described above, in the conventional sliding gear, which does not function as a torque limiter, the second gear portion 33 and the first gear portion 21c, which meshes with the second gear portion 33, attempt to rotate in the reverse direction.

Accordingly, in the conventional sliding gear, at least one of the boss portion 31c, the first gear portion 21c, the second gear portion 33, and the anti-reverse rotation mechanism can be damaged. However, in the present embodiment, even if the main body portion 31 rotates in the second direction of rotation R2 due to the above-described impact force, since the sliding gear 11 functions as a torque limiter, damage due to the impact described above can be prevented.

On the other hand, if the main body portion 31 rotates in the first direction of rotation R1 due to an impact force, the second gear portion 33 attempts to follow and rotate in the first direction of rotation R1. However, in the present embodiment, since the pin member 35 is biased in the biasing direction D described above and the engagement recess 34 is asymmetrical (the inclination of the sliding surface 34b on the downstream side in the first direction of rotation R1 is gradual) as described above, the pin member 35 can easily move from the pressing surface 34a to the sliding surface 34b on the downstream side in the first direction of rotation R1.

That is, it is easier for the main body portion 31 to rotate relative to the second gear portion 33 when the main body portion 31 rotates in the first direction of rotation R1 relative to the second gear portion 33, compared to the situation in which the main body portion 31 rotates in the second direction of rotation R2 relative to the second gear portion 33.

In this state, when the guide groove 27d of the slider 27 presses the boss portion 31c of the main body portion 31 with force greater than or equal to a prescribed pressing force, the main body portion 31 rotates in the first direction of rotation R1 relative to the second gear portion 33. In this manner, even if the force of impact is transmitted from the spool 7 to the slider 27, since the main body portion 31 rotates relative to the second gear portion 33, the transmission of the torque caused by force of impact from the slider 27 to the drive shaft 21 is suppressed. As a result, it is possible to prevent at least one of the boss portion 31c, the first gear portion 21c, and the second gear portion 33 from becoming damaged by the impact.

SUMMARY

In the spinning reel 1 having the configuration described above, in the sliding gear 11, the biasing member 37 biases the pin member 35 in a direction inclined with relative to the radial direction r1 of the main body portion 31 (biasing direction D). As a result, it is possible to raise the limiting torque when the main body portion 31 and the second gear portion 33 rotate integrally. In addition, in the spinning reel 1, since the engagement recess 34 is asymmetrical in the sliding gear 11, it is possible to cause the main body portion 31 to rotate smoothly relative to the second gear portion 33.

OTHER EMBODIMENTS

One embodiment of the present invention was described above, but the present invention is not limited to the above-described embodiment, and various modifications can be made without departing from the scope of the invention. In particular, the various embodiments described in the present Specification may be combined in any manner deemed necessary.

In the embodiment described above, an example was shown in which the sliding gear 11 is disposed between the drive shaft 21 and the reciprocating mechanism 9. Instead, the sliding gear 11 may be disposed between two other configurations that differ from the above-described embodiment, and used as a torque limiter.

In the embodiment described above, an example was shown in which, in the sliding gear 11, the main torque is transmitted from the second gear portion 33 to the main body portion 31, or the transmission of the main torque from the second gear portion 33 to the main body portion 31 is limited.

Instead, the sliding gear 11 can be applied to a configuration or a mechanism in which the main torque is transmitted from the main body portion 31 to the second gear portion 33, or the transmission of the main torque from the main body portion 31 to the second gear portion 33 is limited.

Figure 9:
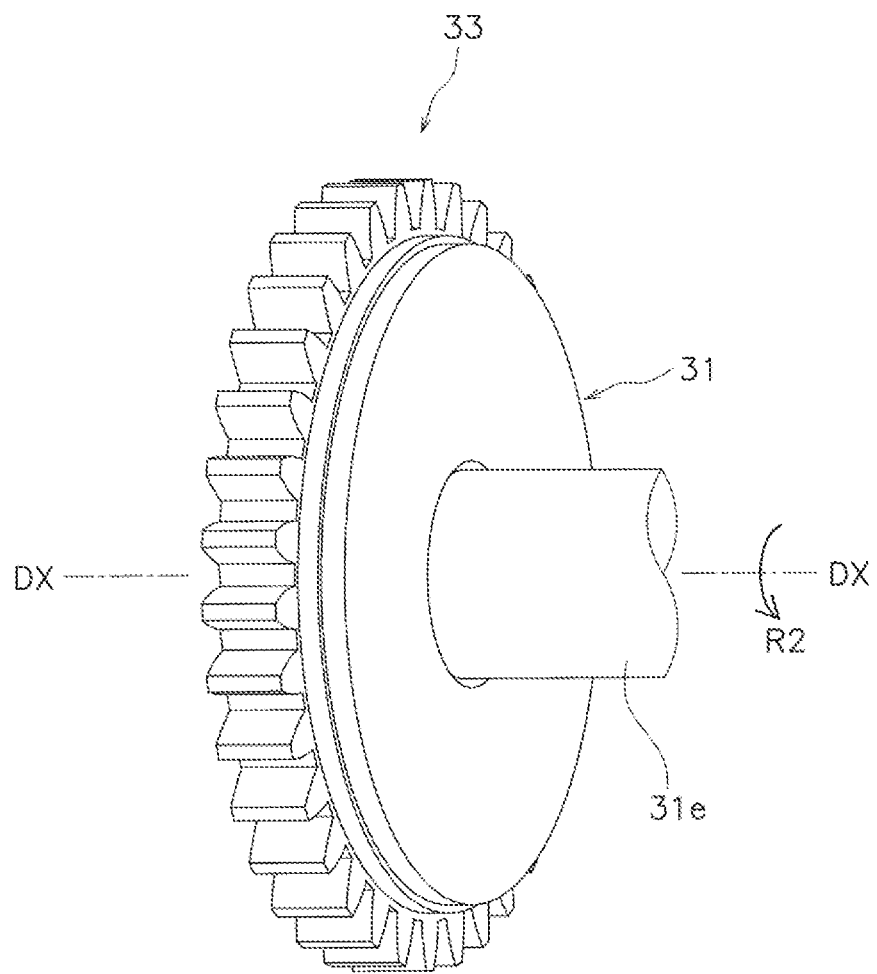
FIG. 9 is a perspective view of the sliding gear according to another embodiment.

In this embodiment, for example, a sliding gear 111 is configured as shown in FIG. 9. The configuration of the sliding gear 111 is substantially the same as the configuration of the embodiment described above. In this embodiment, only configurations that differ from the configurations of the present embodiment will be described. In addition, explanations regarding configurations that are the same as the above-described embodiment are omitted, and the same reference symbols as the above-described embodiment are appended.

In the sliding gear 111, the main torque is input to the main body portion 31. For example, a shaft portion 31e, which serves as the input torque shaft, is disposed on the inner circumferential portion of the main body portion 31 (cylindrical portion 31a) so as to be integrally rotatable therewith. The boss portion 31c is not provided on the main body portion 31.

In this embodiment, with reference to FIG. 8, the second direction of rotation R2 corresponds to the reeling direction. In the same manner as the above-described embodiment, the biasing member 37 biases the pin member 35 in a direction that is inclined relative to the radial direction r1 of the main body portion 31 (biasing direction D).

For example, when torque is input to the main body portion 31 (shaft portion 31e) and the main body portion 31 and the second gear portion 33 integrally rotate in the second direction of rotation R2, the biasing member 37 is inclined relative to the radial direction r1 of the main body portion 31 so as to generate torque Tq and biases the pin member 35.

In this embodiment, the pin member 35 engages the engagement recess 34, and the torque is transmitted from the main body portion 31 to the second gear portion 33. That is, the sliding gear 111 functions as a gear that transmits torque.

In addition, when torque is input to the main body portion 31 (shaft portion 31e) and the main body portion 31 rotates in the second direction of rotation R2 relative to the second gear portion 33, the engagement between the pin member 35 and the engagement recess 34 is released. As a result, the sliding gear 111 functions as a torque limiter.

Furthermore, when torque is input to the second gear portion 33 and the second gear portion 33 rotates in the first direction of rotation R1 relative to the main body portion 31, the engagement between the pin member 35 and the engagement recess 34 is released, and the sliding gear 111 suppresses the torque that is transmitted on the torque transmission path in the opposite direction.

In the embodiment described above, an example was shown in which the present invention is applied to the reciprocating mechanism 9 of the spinning reel 1, but the torque limiting mechanism of the present invention can be applied to a transmission gear and/or a traverse camshaft of a dual-bearing reel. In addition, the torque limiting device of the present invention can be used as a drag mechanism of a dual-bearing reel or a spinning reel.

What is claimed is:

1. A torque limiting device for a fishing reel, comprising:
a first rotating member disposed so as to be rotatable relative to a reel body;
a second rotating member disposed so as to be rotatable relative to the first rotating member radially outside of the first rotating member, and having a recess on an inner circumferential portion thereof;
an engagement member disposed on the first rotating member and configured to cause the second rotating member to rotate integrally with the first rotating member when engaged with the recess; and
a biasing member configured to bias the engagement member from the first rotating member to the second rotating member,
the biasing member biasing the engagement member in a direction inclined relative to a radial direction of the first rotating member.

2. The torque limiting device for a fishing reel according to claim 1, wherein
when one of the first rotating member or the second rotating member rotates in a line winding direction, and an other of the second rotating member or the first rotating member limits the rotation of the one of the first rotating member or the second rotating member, the biasing member biases the engagement member so as to be inclined relative to the radial direction to increase the limiting torque.

3. The torque limiting device for a fishing reel according to claim 1, wherein the recess includes a pressing surface that is pressed by the engagement member when the first rotating member and the second rotating member integrally rotate, and a sliding surface on which the engagement member slides when the first rotating member and the second rotating member rotate relative to each other.

4. A spinning reel, comprising:

a reel body including a rotatable handle;

a spool around which a fishing line is configured to be wound by rotation of the handle;

a reciprocating mechanism having a slider configured to move the spool back and forth in a spool shaft direction to evenly wind the fishing line around the spool; and the torque limiting device according to claim 1 disposed between the handle and the slider.

5. The spinning reel according to claim 4, wherein the first rotating member of the torque limiting device has an engagement portion that engages with the slider, and the second rotating member of the torque limiting device has a gear portion to which torque from a drive shaft is transmitted.

6. The torque limiting device for a fishing reel according to claim 1, wherein the second rotating member includes teeth to mesh with a gear portion of a drive shaft.

7. The torque limiting device for a fishing reel according to claim 1, wherein the biasing member is disposed in the first rotating member.

* * * * *